(12) United States Patent
Chou

(10) Patent No.: US 8,264,457 B2
(45) Date of Patent: Sep. 11, 2012

(54) SYSTEM AND METHOD FOR SIMULATING A COMPUTER MOUSE

(75) Inventor: Meng-Chieh Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 595 days.

(21) Appl. No.: 12/537,359

(22) Filed: Aug. 7, 2009

(65) Prior Publication Data

US 2010/0110003 A1 May 6, 2010

(30) Foreign Application Priority Data

Oct. 30, 2008 (CN) .......................... 2008 1 0305282

(51) Int. Cl.
*G06F 3/033* (2006.01)
(52) U.S. Cl. ........................................ 345/158; 345/156
(58) Field of Classification Search ........... 345/156–158
See application file for complete search history.

(56) References Cited

U.S. PATENT DOCUMENTS

| 6,043,805 A | 3/2000 | Hsieh |
| 7,683,881 B2* | 3/2010 | Sun et al. ...................... 345/156 |
| 7,907,117 B2* | 3/2011 | Wilson et al. ................. 345/156 |

* cited by examiner

*Primary Examiner* — Alexander Eisen
*Assistant Examiner* — Robin Mishler
(74) *Attorney, Agent, or Firm* — Altis Law Group, Inc.

(57) ABSTRACT

A system and method for simulating a computer mouse uses a camera to capture images of a user's palm on a plane, transfers the images to a computer, analyzes the images to determine movement information of the user's palm, and determines a corresponding mouse operation according to preset associations between movements of the user's palm and operations on mouse buttons. The system and method further execute a computer command corresponding to the mouse operation associated with the movement information of the user's palm, so as to activate a action of a cursor displayed on a display screen of the computer.

20 Claims, 9 Drawing Sheets

SYSTEM AND METHOD FOR SIMULATING A COMPUTER MOUSE

BACKGROUND

1. Technical Field

Embodiments of the present disclosure are related to computer peripheral device simulation systems and methods, and particularly to a system and method for simulating a computer mouse.

2. Description of Related Art

At present, there are two main types of computer mice, wired mice and wireless mice. Operations of a wired mouse may be not sensitive due to a limited cable length and material of the wired mouse. A wireless mouse gets rid of the restriction of a cable, but frequent battery replacement of the wireless mouse may be needed due to higher electricity consumption of the wireless mouse.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
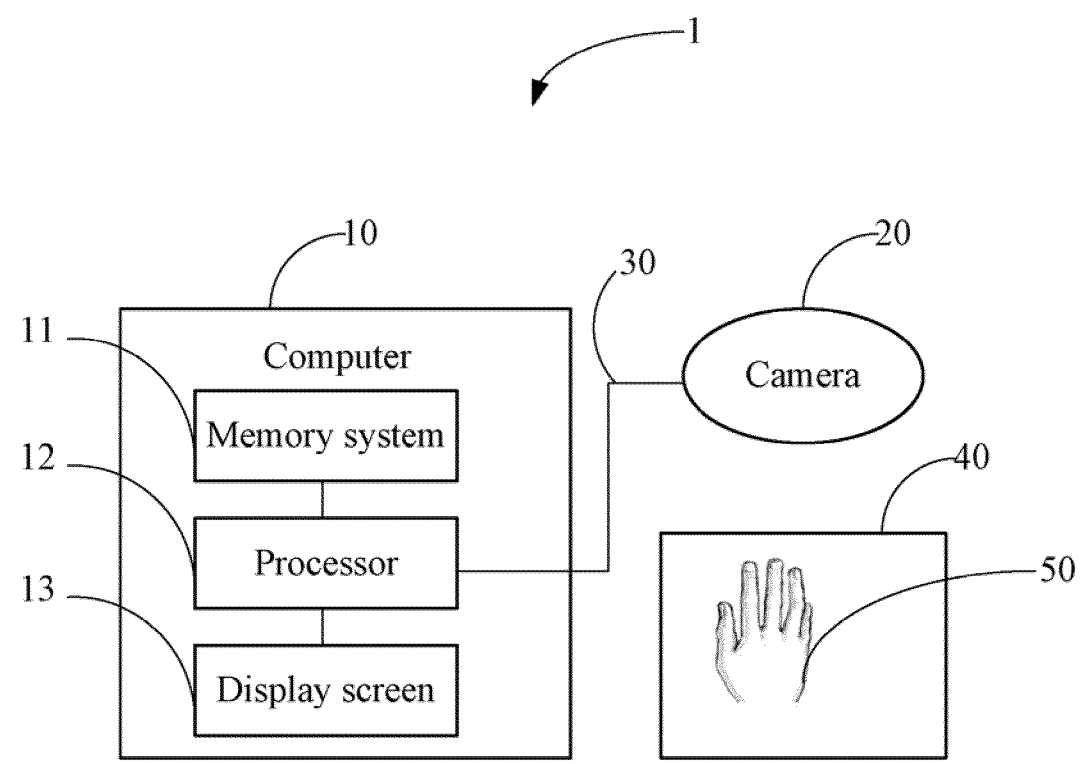
FIG. 1 is a block diagram of one embodiment of a system for simulating a mouse.

FIG. 1 is a block diagram of one embodiment of a system 1 for simulating a mouse using a computer 10, a camera 20 and a user's palm 50. In one embodiment, the computer 10 includes a memory system 11, a processor 12, and a display screen 13. The memory system 11 stores reference information for simulating the mouse, such as computer commands corresponding to operation of buttons of the mouse. For example, when a user clicks a left button of the mouse, a computer command may activate a cursor displayed on the display screen 13 to select one object (e.g. a file folder) on a user interface displayed on the display screen 13. The reference information further includes an effective movement area of the mouse to be simulated, a visual angle and a resolution of the camera 20 to be adjustably positioned above the effective movement area and to be connected to the computer 10.

It is understood that the effective movement area is a region on a plane that the mouse can move on. For example, when the mouse moves within the effective movement area, the cursor synchronously moves on the user interface displayed on the display screen 13, however, if the mouse moves beyond the effective movement area, the cursor will stays within margins of the user interface displayed on the display screen 13. The visual angle is the angle a viewed object (such as a mouse or the user's palm) subtends at the lens of the camera 20, usually stated in degrees of arc.

Figure 2:
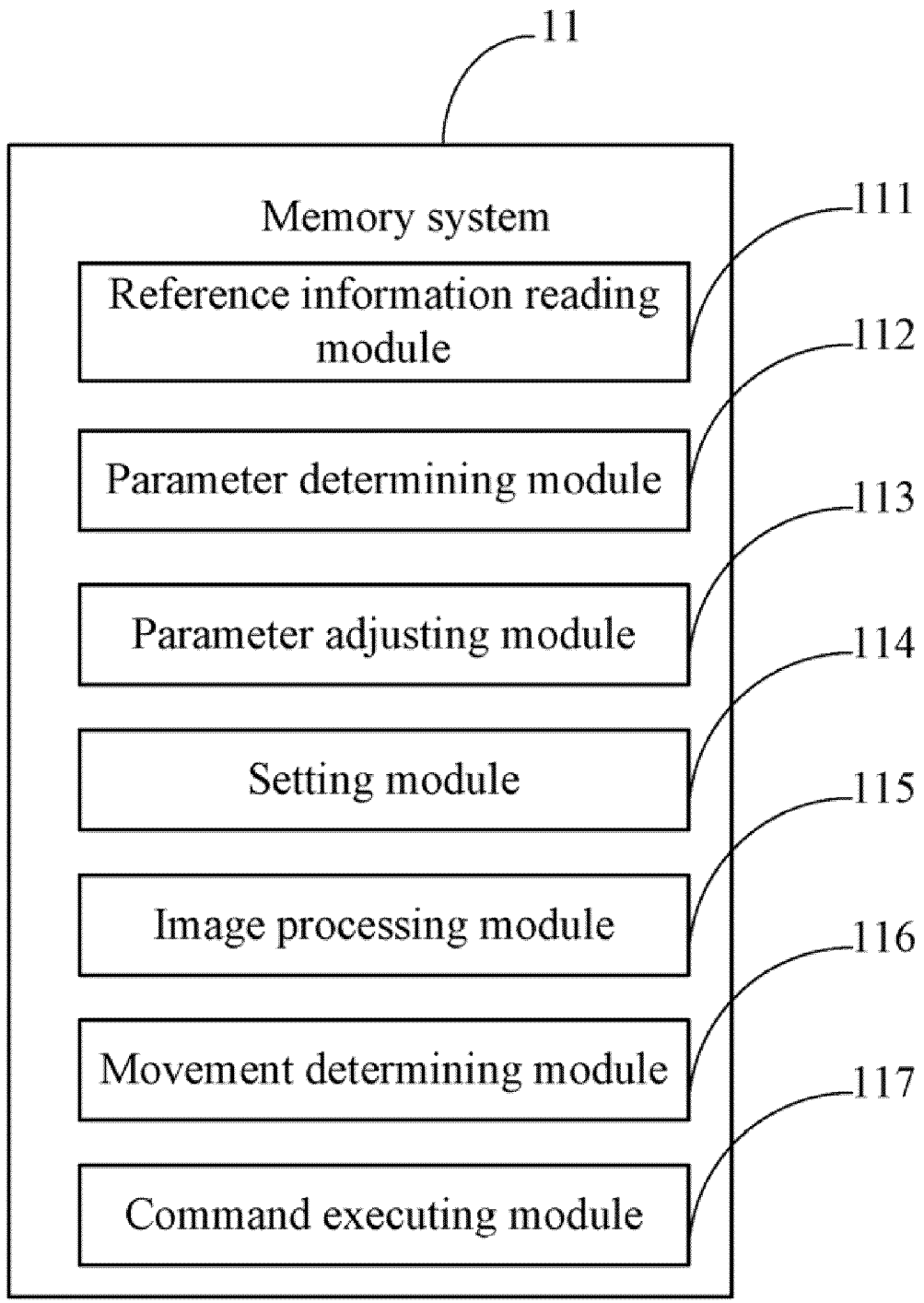
FIG. 2 is a block diagram of one embodiment of function modules stored in a memory system in FIG. 1.

In one embodiment, the memory system 11 further stores a plurality of function modules as shown in FIG. 2, such as a reference information reading module 111, a parameter determining module 112, a parameter adjusting module 113, a setting module 114, an image processing module 115, a movement determining module 116, and a command executing module 117. The memory system 11 may be an external storage card, e.g., a smart media card, a secure digital card, a compact flash card, for example. The processor 12 executes one or more codes of the modules 111-117, so as to provide one or more operations of the system 1 for simulating the mouse.

Figure 6:
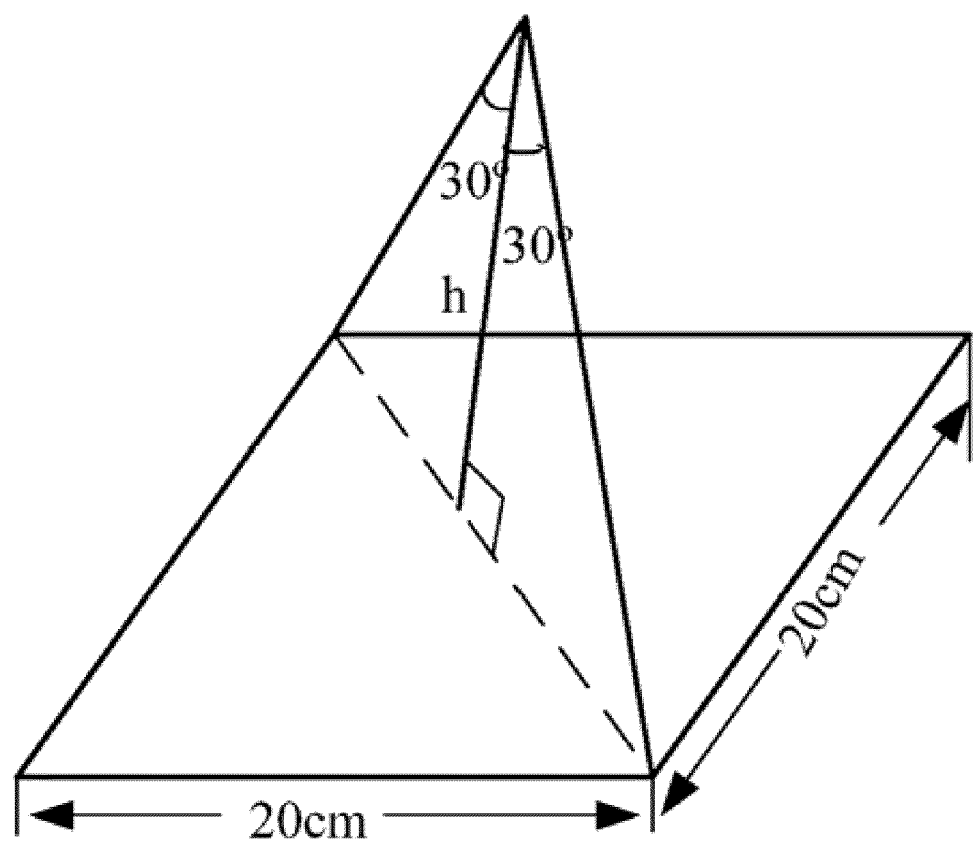
FIG. 6 and FIG. 7 illustrate a minimal adjustable height and an effective adjustable height of a camera.

The reference information reading module 111 reads the reference information for simulating the mouse from the memory system 11. As mentioned above, the reference information includes the computer commands corresponding to operation of mouse buttons, the effective movement area of the mouse to be simulated, the visual angle and the resolution of the camera 20. In one embodiment, as shown in FIG. 6, the effective movement area is 20 cm*20 cm, and the camera 20 is a video graphic array (VGA) camera having a visual angle of 60 degrees and a resolution of 640*480 pixels.

The parameter determining module 112 determines a minimum capture area of the camera 20 according to the effective movement area of the mouse. As mentioned above, the effective movement area is 20 cm*20 cm, so the minimum capture area of the camera 20 is 20 cm*20 cm. The parameter determining module 12 further determines a lowest adjustable height of the camera 20 according to the minimum capture area and the visual angle of the camera 20. For example, as mentioned above, the visual angle of the camera 20 is 60 degrees and the minimum capture area of the camera 20 is 20 cm*20 cm, so the lowest adjustable height "h" of the camera 20 is: $h=\frac{1}{2}*(20^2+20^2)^{1/2}$ cm*(cot 30°)=24.49 cm (as shown in FIG. 6). Moreover, the parameter determining module 12 determines a length-to-width ratio of images to be captured by the camera 20 according to the resolution of the camera 20. For example, as mentioned above, the resolution of the camera 20 is 640*480 pixels, so the length-to-width ratio of images to be captured by the camera 20 is: 640:480=40:30. The lowest adjustable height of the camera is the lowest height that the camera 20 can be adjustable.

Figure 7:
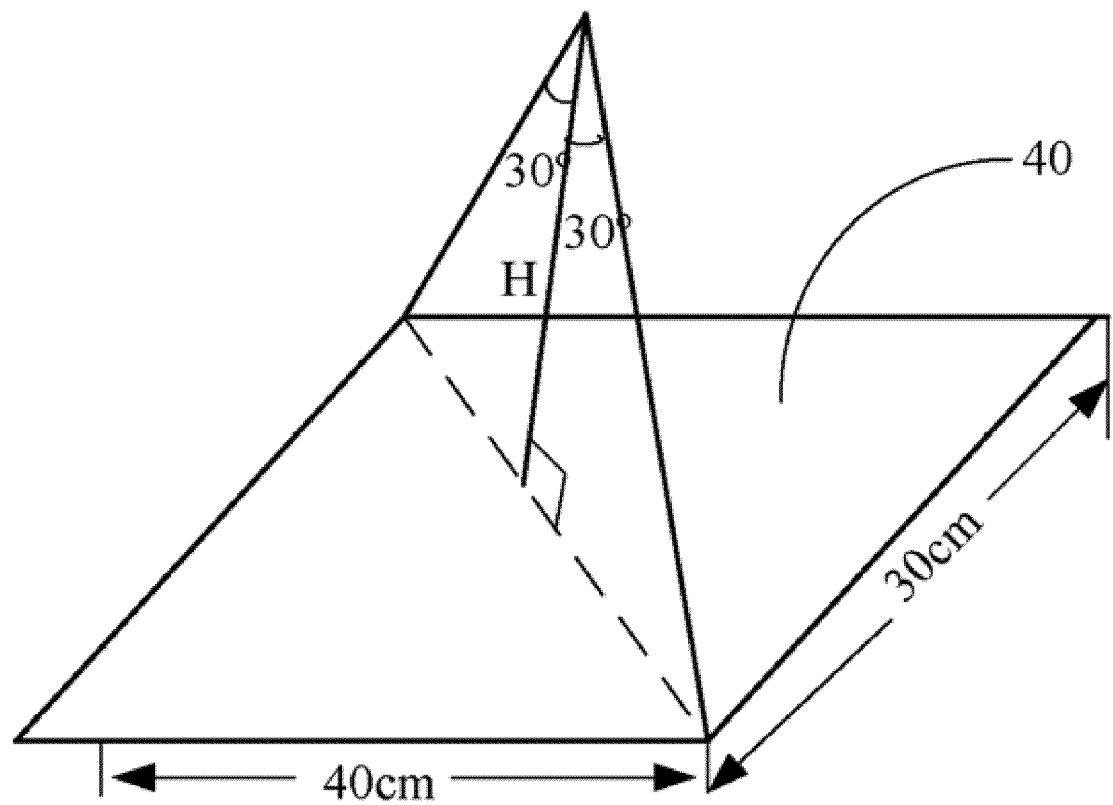

The parameter adjusting module 113 adjusts the minimum capture area to be the effective capture area 40 of the camera 20 according to the length-to-width ratio. For example, the parameter adjusting module 13 adjusts the minimum capture area of 20 cm*20 cm to be the effective capture area 40 of 40 cm*30 cm, for simplifying computation of image differences described below. Furthermore, the parameter adjusting module 13 adjusts the lowest adjustable height to be an effective adjustable height of the camera 20 according to the effective camera area 40. For example, as shown in FIG. 7, the visual angle of the camera 20 is 60 degrees and the effective capture area 40 is 40 cm*30 cm, so the effective adjustable height "H" of the camera 20 is: H=25 cm*(cot 30°)=43.3 cm. In addition, the parameter adjusting module 13 may prompt a user to position the camera 20 according to the effective adjustable height computed above.

The setting module 114 receives a user-determined time interval (e.g., 1 second), for detecting movement of the user's palm 50 in the effective capture area 40. The setting module 114 also receives user input about associations between the movements of the user's palm 50 and mouse operations (detailed description will be given in FIG. 4).

Figure 8:
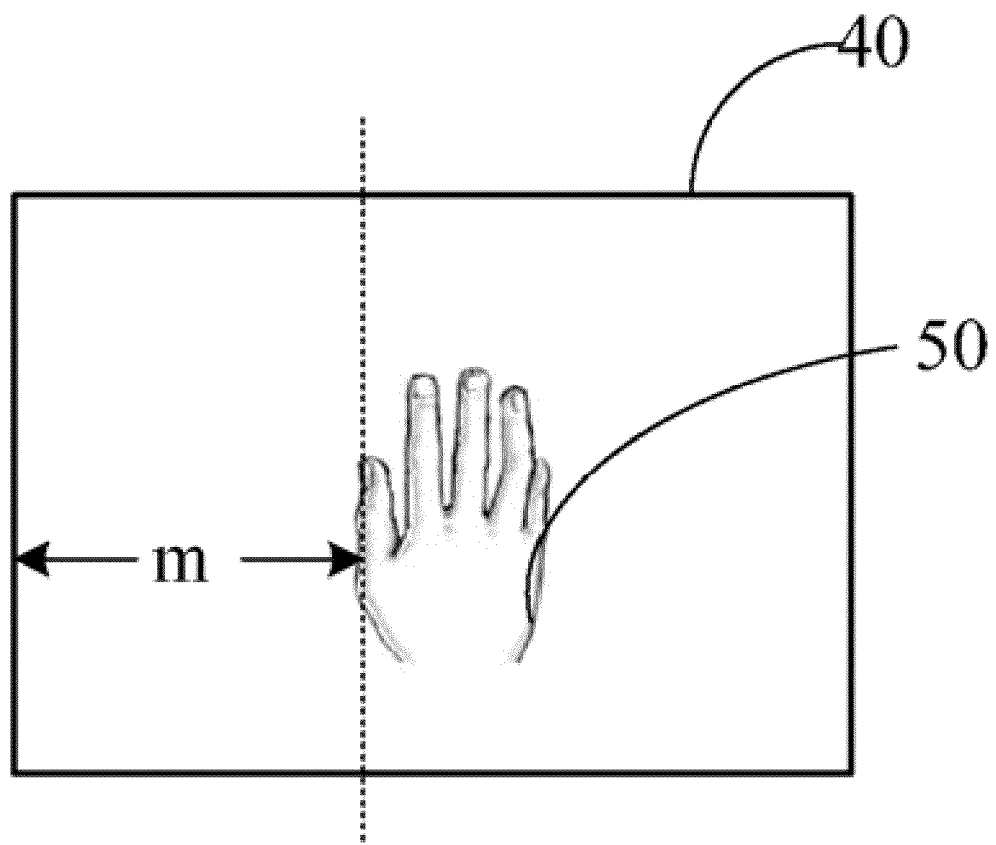
FIG. 8 and FIG. 9 illustrate the user's palm in an effective area.
Figure 9:
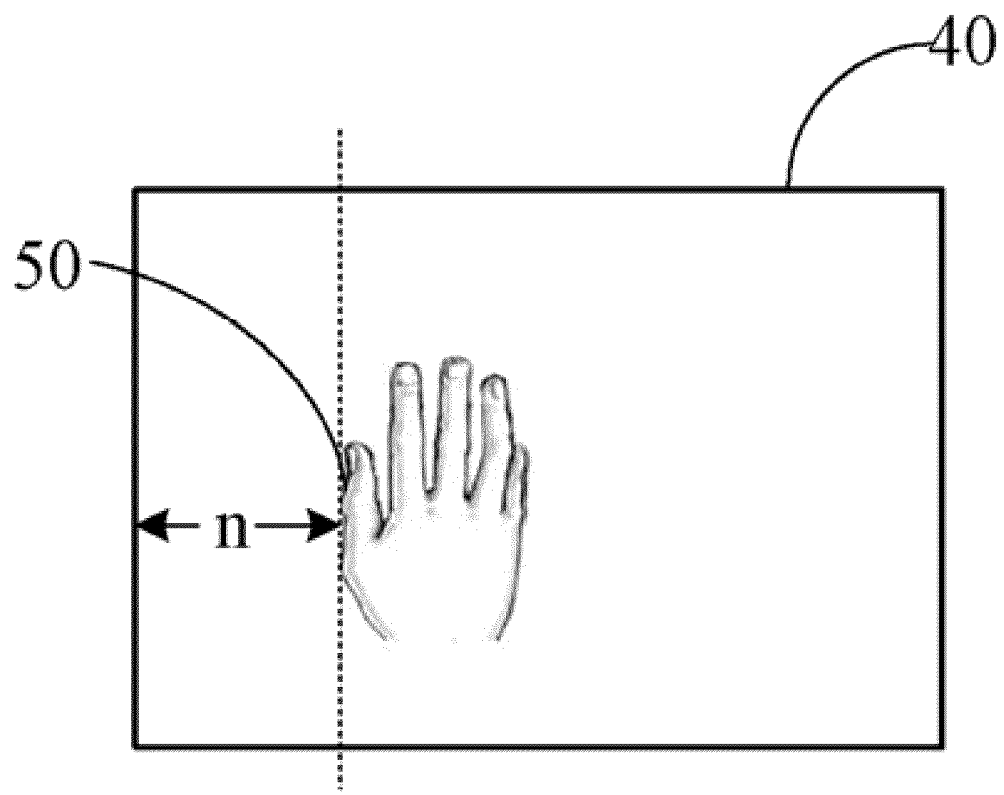

The image processing module 115 reads consecutive images of the user's palm 50 captured by the camera 20 in the time interval, and converts the consecutive images to binary images. In one embodiment, the binary images have two values for each pixel, 0 (i.e., black) and 255 (i.e., white). As a result, as shown in FIG. 8 and FIG. 9, the color of the user's palm 50 in a binary image is the foreground color (i.e., black), while the rest of the image is the background color (i.e., white).

The movement determining module 116 determines movement information of the user's palm 50 according to differences in the binary images (detailed description will be given in FIG. 5), and determines a mouse operation associated with the movement according to the associations between the movements of the user's palm 50 and mouse operations. For example, if the user's palm 50 moves leftwards, the associated mouse operation may be a leftward movement of the mouse.

The command executing module 117 executes a computer command corresponding to the mouse operation, so as to active a corresponding action of the cursor on the display screen 13. For example, as mentioned above, if the mouse operation associated with the movement of the user's palm 50 is the leftward movement of the mouse, the command executing module 117 executes a computer command to control the cursor to move leftwards on the display screen 13 of the computer 10.

Figure 3:
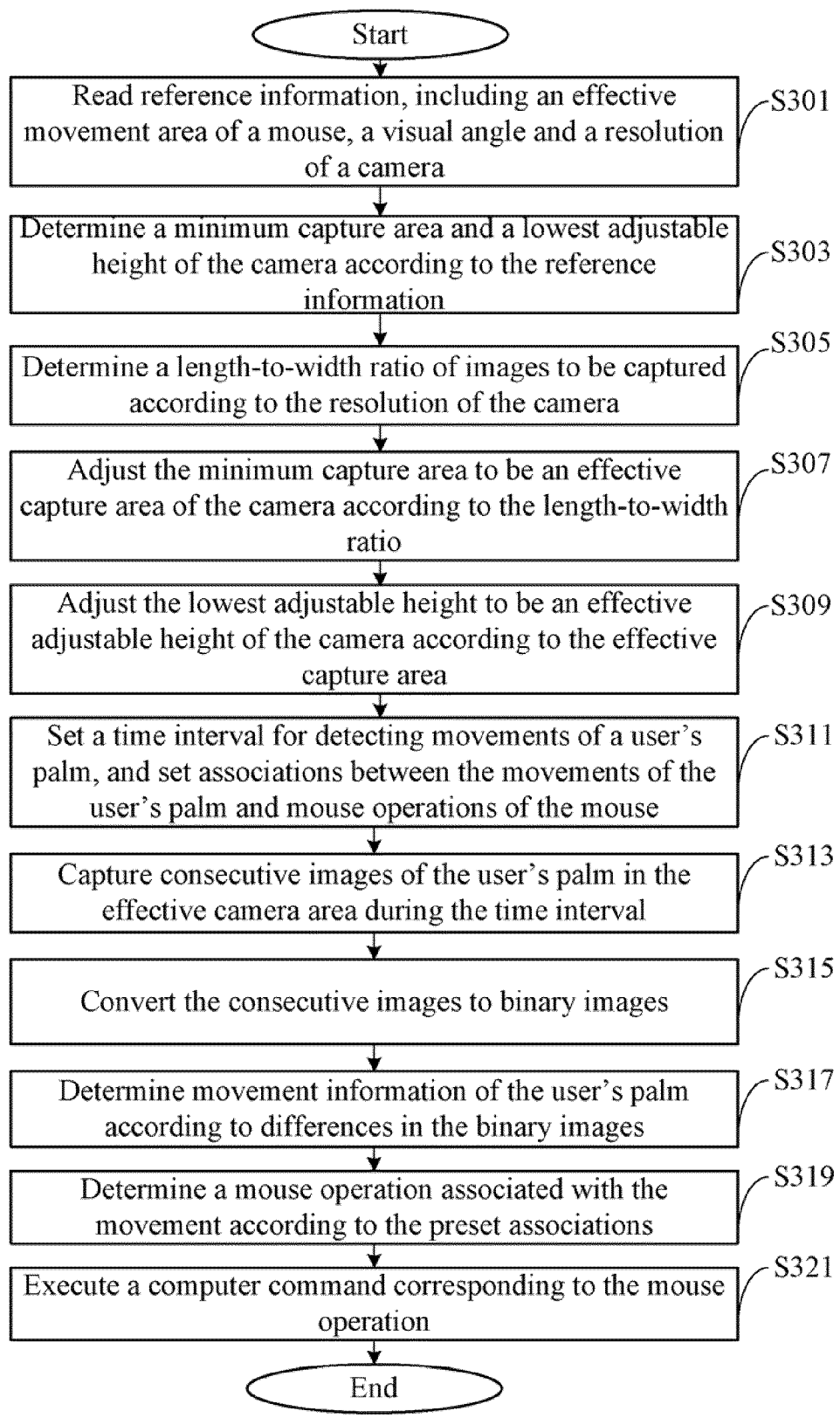
FIG. 3 is a flowchart of one embodiment of a method for simulating a mouse.

FIG. 3 is a flowchart of one embodiment of a method for simulating a mouse. Depending on the embodiment, additional blocks may be added, others removed, and the ordering of the blocks may be changed.

In block S301, the reference information reading module 111 reads the reference information for simulating the mouse from the memory system. As mentioned above, the reference information includes computer commands corresponding to operation of mouse buttons, an effective movement area of the mouse to be simulated, the visual angle and the resolution of the camera 20. In one embodiment, as shown in FIG. 6, the effective movement area is 20 cm*20 cm, the visual angle of the camera 20 is 60 degrees, and the resolution of the camera 20 is 640*480 pixels.

In block S303, the parameter determining module 112 determines a minimum capture area of the camera 20 according to the effective movement area of the mouse to be simulated. For example, the effective movement area is 20 cm*20 cm, so the minimum capture area of the camera 20 is 20 cm*20 cm. The parameter determining module 12 further determines a lowest adjustable height of the camera 20 according to the minimum capture area and the visual angle of the camera 20. For example, as mentioned above, the visual angle of the camera 20 is 60 degrees and the minimum capture area of the camera 20 is 20 cm*20 cm, so the lowest adjustable height "h" of the camera 20 is: $h=\frac{1}{2}*(20^2+20^2)^{1/2}$ cm* (cot 30°)=24.49 cm (as shown in FIG. 6).

In block S305, the parameter determining module 12 determines a length-to-width ratio of images to be captured by the camera 20 according to the resolution of the camera 20. As mentioned above, the resolution of the camera 20 is 640*480 pixels, so the length-to-width ratio of images to be captured by the camera 20 is: 640:480=40:30.

In block S307, the parameter adjusting module 113 adjusts the minimum capture area to be an effective capture area 40 of the camera 20 according to the length-to-width ratio. For example, the parameter adjusting module 13 adjusts the minimum capture area of 20 cm*20 cm to be the effective capture area 40 of 40 cm*30 cm, for simplifying computation of image differences that will be described in FIG. 5.

In block S309, the parameter adjusting module 113 adjusts the lowest adjustable height to be an effective adjustable height of the camera 20 according to the effective camera area 40, and prompts a user to install the camera 20 according to the effective adjustable height. For example, as mentioned above, the visual angle of the camera 20 is 60 degrees and the effective capture area 40 is 40 cm*30 cm, so the effective adjustable height "H" of the camera 20 is: H=25 cm*(cot 30°)=43.3 cm (as shown in FIG. 7). Then the user positions the camera 20 above the effective capture area 40 with a height equal or approaches to 43.3 cm.

In block S311, the setting module 114 receives a user-determined time interval for detecting movements of the user's palm 50 in the effective capture area 40, and receives user input about associations between movements of the user's palm 50 and mouse operations (detailed description will be given in FIG. 4). In one embodiment, the time interval is set as 1 second.

In block S313, the camera 20 captures consecutive images of the user's palm 50 in the effective capture area 40 during the time interval, and transfers the consecutive images to the computer 10 via the data bus 30. For example, the camera 20 may capture 10 consecutive images in 1 second, and transfer the 10 consecutive images to the computer 10.

In block S315, the image processing module 115 reads the consecutive images, and converts the consecutive images to binary images. As mentioned above, the binary images have two values for each pixel, 0 (i.e., black) and 255 (i.e., white). As a result, as shown in FIG. 8 and FIG. 9, the color of the user's palm 50 in the binary images is the foreground color (i.e., black), while the rest of the images is the background color (i.e., white).

In block S317, the movement determining module 116 determines movement information of the user's palm 50 according to differences in the binary images (detailed description will be given in FIG. 5).

In block S319, the movement determining module 116 determines a mouse operation associated with the movement according to the preset associations. For example, if the user's palm 50 moves leftwards, the associated mouse operation may be a leftward movement of the mouse.

In block S321, the command executing module 117 executes a computer command corresponding to the mouse operation, so as to active a corresponding action of the cursor on the display screen 13. For example, as mentioned above, if the mouse operation associated with the movement of the user's palm 50 is the leftward movement of the mouse, the command executing module 117 executes a computer command to control the cursor to move leftwards on the display screen 13.

Figure 4:
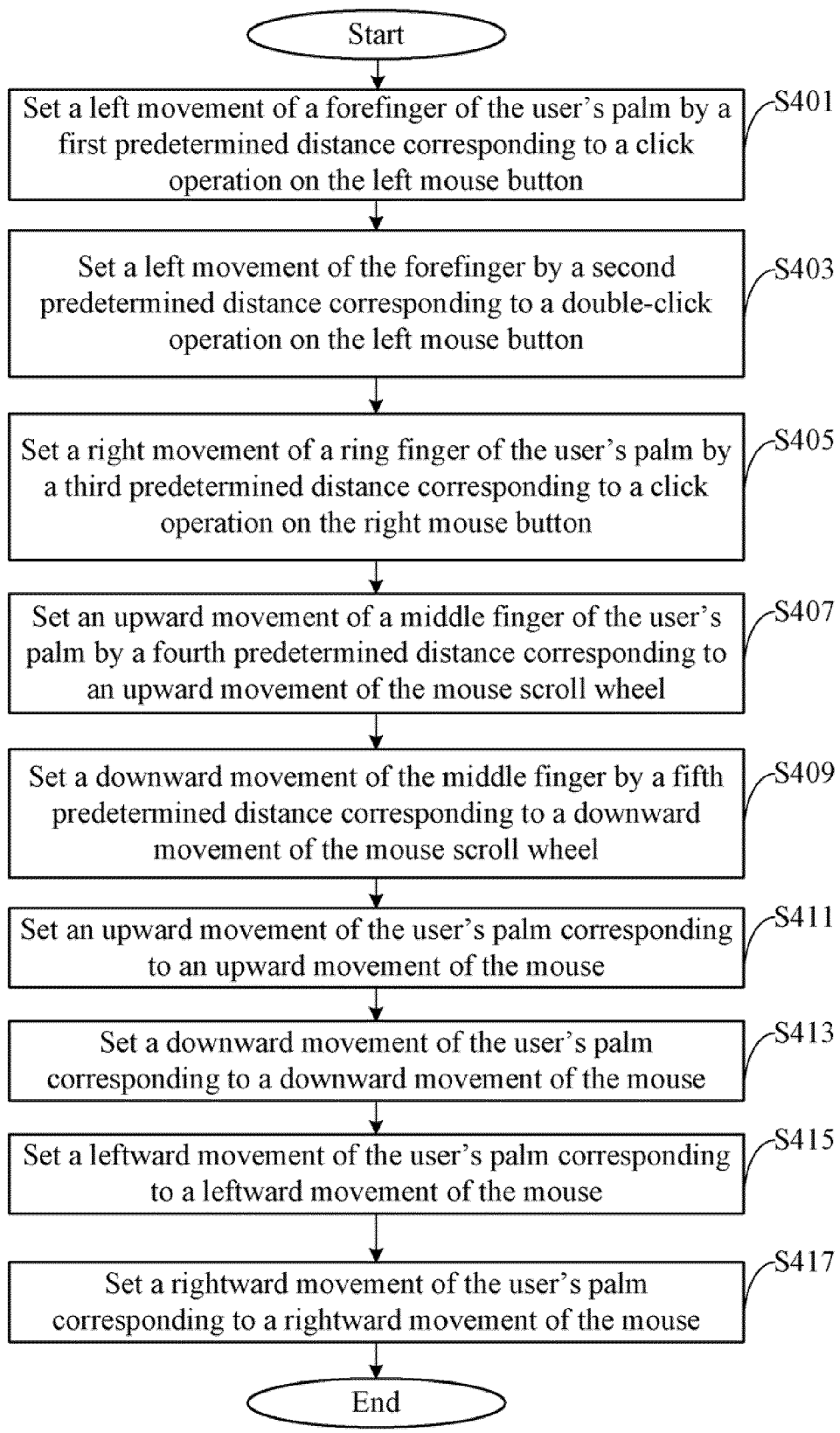
FIG. 4 is a detailed description of one block of setting associations between movements of a user's palm and mouse operations in FIG. 3.

FIG. 4 is a detailed description of block S311 in FIG. 3. Depending on the embodiment, additional blocks may be added, others removed, and the ordering of the blocks may be changed.

In block S401, the setting module 114 sets a right movement of a ring finger of the user's palm 50 by a first predetermined distance in the effective capture area 40 corresponding to a click operation on the left mouse button. The first predetermined distance may be an integer, such as 1 cm or 2 cm, or a numerical interval, such as 1 cm~2 cm, for example. It may be understood that, this embodiment only gives one example, people can set any movement of any finger or any movement of the user palm 50 corresponding to any suitable mouse button operation.

In block S403, the setting module 114 sets a left movement of the forefinger of the user's palm 50 by a second predetermined distance in the effective capture area 40 corresponding to a double-click operation on the left mouse button. The second predetermined distance, which is different from the first predetermined distance, which also may be an integer (e.g., 3 cm) or a numerical interval (e.g., 2.1 cm~4 cm).

In block S405, the setting module 114 sets a right movement of a ring finger of the user's palm 50 by a third predetermined distance in the effective capture area 40 corresponding to a click operation on the right mouse button. The third predetermined distance also may be an integer or a numerical interval.

In block S407, the setting module 114 sets an upward movement of a middle finger of the user's palm 50 by a fourth predetermined distance in the effective capture area 40 corresponding to an upward movement of the mouse scroll wheel. The fourth predetermined distance also may be an integer or a numerical interval.

In block S409, the setting module 114 sets a downward movement of the middle finger by a fifth predetermined distance corresponding to a downward movement of the mouse scroll wheel. The fifth predetermined distance also may be an integer or a numerical interval.

In block S411, the setting module 114 sets an upward movement of the user's palm 50 in the effective capture area 40 corresponding to an upward movement of the mouse.

In block S413, the setting module 114 sets a downward movement of the user's palm 50 in the effective capture area 40 corresponding to a downward movement of the mouse.

In block S415, the setting module 114 sets a leftward movement of the user's palm 50 in the effective capture area 40 corresponding to a leftward movement of the mouse.

In block S417, the setting module 114 sets a rightward movement of the user's palm 50 in the effective capture area 40 corresponding to a rightward movement of the mouse.

Figure 5:
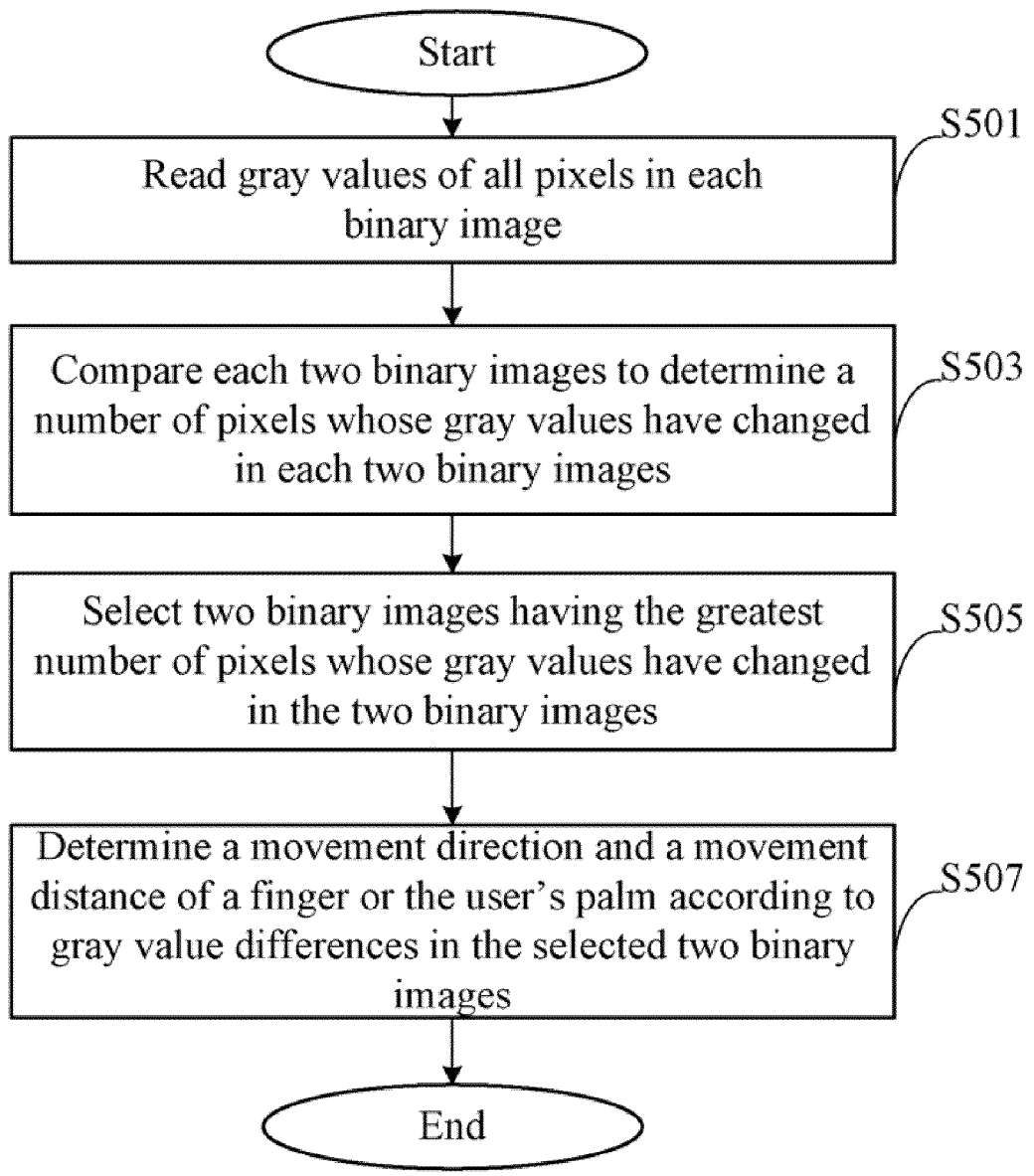
FIG. 5 is a detailed description of one block of determining movement information of the user's palm in FIG. 3.

FIG. 5 is a detailed description of block S317 in FIG. 3. Depending on the embodiment, additional blocks may be added, others removed, and the ordering of the blocks may be changed.

In block S501, the movement determining module 116 reads gray values of all pixels in each binary image. As mentioned above, a binary image only has two gray values for each pixel in the binary image, 0 and 255.

In block S503, the movement determining module 116 compares each two binary images to determine a number of pixels whose gray values have changed in the two binary images. For example, the movement determining module 116 compares the binary image A shown in FIG. 8 and the binary image B shown in FIG. 9, to determine the pixels whose gray values have changed from "0" to "255," or changed from "255" to "0," and totalizes the number of pixels whose gray values change in the binary images A and B. It is understood that the binary image A is captured prior to the binary image B.

In block S505, the movement determining module 116 selects two binary images which have the greatest number of pixels whose gray values have changed in the two binary images. In one embodiment, the binary image A shown in FIG. 8 and the binary image B shown in FIG. 9 are the selected two binary images which have the greatest number of pixels whose gray values have changed.

In block S507, the movement determining module 116 determines a movement direction and a movement distance of a finger or the palm 50 according to gray value differences in the selected two binary images. As mentioned above, the resolution of the camera 20 is 640*480 pixels, so each binary image has 640*480 pixels, and the effective capture area 40 is 40 cm*30 cm. That is, it may be regarded that 16 pixels distributed in a horizontal or vertical direction in each binary image corresponds to 1 cm distance in a horizontal or vertical direction in the effective capture area 40. Furthermore, in each binary image, gray values of pixels in the region covered by the user's palm 50 are "0," and gray values of pixels in other regions are "255." Supposing that there are "m" pixels with the gray value "255" distributed in the horizontal direction between the user's palm 50 and the left margin of the binary image A in FIG. 8, and there are "n" pixels (n<m) with the gray value "255" distributed in the horizontal direction between the user's palm 50 and the left margin of the binary image B in FIG. 9, while gray values of pixels between the user's palm 50 and the upper margin/the lower margin are the same in the binary images A and B, then the movement determining module 116 determines the user's palm 50 moves leftwards in 1 second, and the movement distance "d" is computed as follows: $d=(m-n)/16$.

The embodiments use a camera and user's palm to simulate a mouse for inputting information to a computer. The computer stores preset associations between movements of the user's palm 50 and operations of the mouse. The camera captures consecutive images of the user's palm 50 in a time interval, then the computer analyzes the images to determine movement information of the user's palm 50 in the time interval, determines a mouse operation corresponding to the movement information of the user's palm 50 based on preset associations, and executes a computer command corresponding to the mouse operation, so as to active a corresponding action of a cursor on a display of the computer.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A mouse simulation system, comprising:
   a memory system;
   at least one processor; and
   one or more programs stored in the memory system to be executed by the at least one processor, the one or more programs comprising:
   a reference information reading module to read reference information for simulating a mouse from the memory system, wherein the reference information comprises an effective movement area of the mouse, a visual angle and a resolution of a camera adjustably positioned above the effective movement area on a plane and connected to the at least one processor;
   a parameter determining module to determine a minimum capture area and a lowest adjustable height of the camera from the plane according to the reference information, and determine a length-to-width ratio of images to be captured by the camera according to the resolution of the camera;
   a parameter adjusting module to adjust the minimum capture area to be an effective capture area of the camera according to the length-to-width ratio, adjust the lowest adjustable height to be an effective adjustable height of the camera according to the effective capture area, and prompt a user to position the camera according to the effective adjustable height;

a setting module to set a time interval for detecting movements of a user's palm in the effective capture area on the plane, and set associations between the movements of the user's palm in the effective capture area and mouse operations of the mouse;

an image processing module to read consecutive images of the user's palm in the effective camera area captured by the camera during the time interval, and convert the consecutive images to binary images;

a movement determining module to determine movement information of the user's palm according to differences in the binary images, and determine a mouse operation associated with the movement according to the preset associations; and a command executing module to execute a computer command corresponding to the mouse operation, so as to active a corresponding movement of a cursor on a display screen of connected to the at least one processor.

2. The mouse simulation system as claimed in claim 1, wherein a gray value of a pixel in the binary images is either 0 or 255.

3. The mouse simulation system as claimed in claim 1, wherein the setting associations between the movements of the user's palm and mouse operations comprises:

setting a left movement of a forefinger of the user's palm by a first predetermined distance corresponding to a click operation on the left mouse button;

setting a left movement of the forefinger by a second predetermined distance corresponding to a double-click operation on the left mouse button;

setting a right movement of a ring finger of the user's palm by a third predetermined distance corresponding to a click operation on the right mouse button;

setting a upward movement of a middle finger of the user's palm by a fourth predetermined distance corresponding to a upward movement of the mouse scroll wheel;

setting a downward movement of the middle finger by a fifth predetermined distance corresponding to a downward movement of the mouse scroll wheel;

setting a upward movement of the user's palm corresponding to a upward movement of the mouse;

setting a downward movement of the user's palm corresponding to a downward movement of the mouse;

setting a leftward movement of the user's palm corresponding to a leftward movement of the mouse; and setting a rightward movement of the user's palm corresponding to a rightward movement of the mouse.

4. The mouse simulation system as claimed in claim 3, wherein each of the first, second, third, fourth and fifth predetermined distances is an integer or a numerical interval, and the second predetermined distance is different from the first predetermined distance.

5. The mouse simulation system as claimed in claim 1, wherein determining movement information of the user's palm according to differences in the binary images comprises:

reading gray values of all pixels in each binary image;

comparing each two binary images to determine a number of pixels whose gray values have changed in each two binary images;

selecting two binary images that has the greatest number of pixels whose gray values have changed in the two binary images; and determining a movement direction and a movement distance of a finger or the user's palm on the plane according to gray value differences in the selected two binary images.

6. The mouse simulation system as claimed in claim 1, wherein the time interval is one second.

7. The mouse simulation system as claimed in claim 1, wherein the memory system is selected from the group consisting of a smart media card, a secure digital card, and a compact flash card.

8. A computer-implemented method for simulating a mouse, the method comprising:

reading reference information for simulating the mouse from a memory system of a computer, wherein the reference information comprises an effective movement area of a mouse, a visual angle and a resolution of a camera to be adjustably positioned above the effective movement area on a plane and connected to the computer;

determining a minimum capture area and a lowest adjustable height of the camera from the plane according to the reference information, and determining a length-to-width ratio of images to be captured by the camera according to the resolution of the camera;

adjusting the minimum capture area to be an effective capture area of the camera according to the length-to-width ratio, adjusting the lowest adjustable height to be an effective adjustable height of the camera according to the effective capture area, and prompting a user to position the camera according to the effective adjustable height;

setting a time interval for detecting movements of a user's palm in the effective camera area on the plane, and setting associations between the movements of the user's palm in the effective camera area and mouse operations of the mouse;

reading consecutive images of the user's palm in the effective camera area captured by the camera during the time interval, and converting the consecutive images to binary images;

determining movement information of the user's palm in the effective camera area according to differences in the binary images, and determining a mouse operation associated with the movement according to the preset associations; and executing a computer command corresponding to the mouse operation, so as to active a corresponding action of a cursor on a display screen of the computer.

9. The method as claimed in claim 8, wherein setting associations between the movements of the user's palm and mouse operations comprises:

setting a left movement of a forefinger of the user's palm by a first predetermined distance corresponding to a click operation on the left mouse button;

setting a left movement of the forefinger by a second predetermined distance corresponding to a double-click operation on the left mouse button;

setting a right movement of a ring finger of the user's palm by a third predetermined distance corresponding to a click operation on the right mouse button;

setting an upward movement of a middle finger of the user's palm by a fourth predetermined distance corresponding to an upward movement of the mouse scroll wheel;

setting a downward movement of the middle finger by a fifth predetermined distance corresponding to a downward movement of the mouse scroll wheel;

setting an upward movement of the user's palm corresponding to an upward movement of the mouse;
setting a downward movement of the user's palm corresponding to a downward movement of the mouse;
setting a leftward movement of the user's palm corresponding to a leftward movement of the mouse; and
setting a rightward movement of the user's palm corresponding to a rightward movement of the mouse.

10. The method as claimed in claim 8, wherein a gray value of a pixel in the binary images is either 0 or 255.

11. The method as claimed in claim 9, wherein each of the first, second, third, fourth and fifth predetermined distances is an integer or a numerical interval, and the second predetermined distance is different from the first predetermined distance.

12. The method as claimed in claim 8, wherein determining movement information of the user's palm according to differences in the binary images comprises:
reading gray values of all pixels in each binary image;
comparing each two binary images to determine a number of pixels whose gray values have changed in each two binary images;
selecting two binary images having the greatest number of pixels whose gray values have changed in the two binary images; and
determining a movement direction and a movement distance of a finger or the user's palm on the plane according to gray value differences in the selected two binary images.

13. The method as claimed in claim 8, wherein the time interval is one second.

14. The method as claimed in claim 8, wherein the memory system is selected from the group consisting of a smart media card, a secure digital card, and a compact flash card.

15. A non-transitory storage medium storing a set of instructions, the set of instructions capable of being executed by a processor to perform a method for simulating a mouse, the method comprising:
reading reference information for simulating the mouse from a memory system, wherein the reference information comprises an effective movement area of a mouse, a visual angle and a resolution of a camera to be adjustable positioned above the effective movement area on a plane and connected to the processor;
determining a minimum capture area and a lowest adjustable height of the camera from the plane according to the reference information, and determining a length-to-width ratio of images to be captured by the camera according to the resolution of the camera;
adjusting the minimum capture area to be an effective capture area of the camera according to the length-to-width ratio, adjusting the lowest adjustable height to be an effective adjustable height of the camera according to the effective capture area, and prompting a user to position the camera according to the effective adjustable height;
setting a time interval for detecting movements of a user's palm in the effective camera area on the plane, and setting associations between the movements of the user's palm in the effective camera area and mouse operations of the mouse;
reading consecutive images of the user's palm in the effective camera area captured by the camera during the time interval, and converting the consecutive images to binary images;
determining movement information of the user's palm in the effective camera area according to differences in the binary images, and determining a mouse operation associated with the movement according to the preset associations;
executing a computer command corresponding to the mouse operation by the processor, so as to active a corresponding action of a cursor on a display screen connected to the processor.

16. The non-transitory storage medium as claimed in claim 15, wherein a gray value of a pixel in the binary images is either 0 or 255.

17. The non-transitory storage medium as claimed in claim 15, wherein setting associations between the movements of the user's palm and mouse operations comprises:
setting a left movement of a forefinger of the user's palm by a first predetermined distance corresponding to a click operation on the left mouse button;
setting a left movement of the forefinger by a second predetermined distance corresponding to a double-click operation on the left mouse button;
setting a right movement of a ring finger of the user's palm by a third predetermined distance corresponding to a click operation on the right mouse button;
setting a upward movement of a middle finger of the user's palm by a fourth predetermined distance corresponding to a upward movement of the mouse scroll wheel;
setting a downward movement of the middle finger by a fifth predetermined distance corresponding to a downward movement of the mouse scroll wheel;
setting a upward movement of the user's palm corresponding to a upward movement of the mouse;
setting a downward movement of the user's palm corresponding to a downward movement of the mouse;
setting a leftward movement of the user's palm corresponding to a leftward movement of the mouse; and
setting a rightward movement of the user's palm corresponding to a rightward movement of the mouse.

18. The non-transitory storage medium as claimed in claim 17, wherein each of the first, second, third, fourth and fifth predetermined distances is an integer or a numerical interval, and the second predetermined distance is different from the first predetermined distance.

19. The non-transitory storage medium as claimed in claim 16, wherein determining movement information of the user's palm according to differences in the binary images comprise:
reading gray values of all pixels in each binary image;
comparing each two binary images to determine a number of pixels whose gray values have changed in each two binary images;
selecting two binary images that has the greatest number of pixels whose gray values have changed in the two binary images; and
determining a movement direction and a movement distance of a finger or the user's palm on the plane according to gray value differences in the selected two binary images.

20. The non-transitory storage medium as claimed in claim 15, wherein the storage medium is selected from the group consisting of a smart media card, a secure digital card, and a compact flash card.

* * * * *